Oct. 2, 1923.
A. S. KROTZ
TRACTOR CULTIVATOR ATTACHMENT
Filed Aug. 16, 1920    3 Sheets-Sheet 3
1,469,262
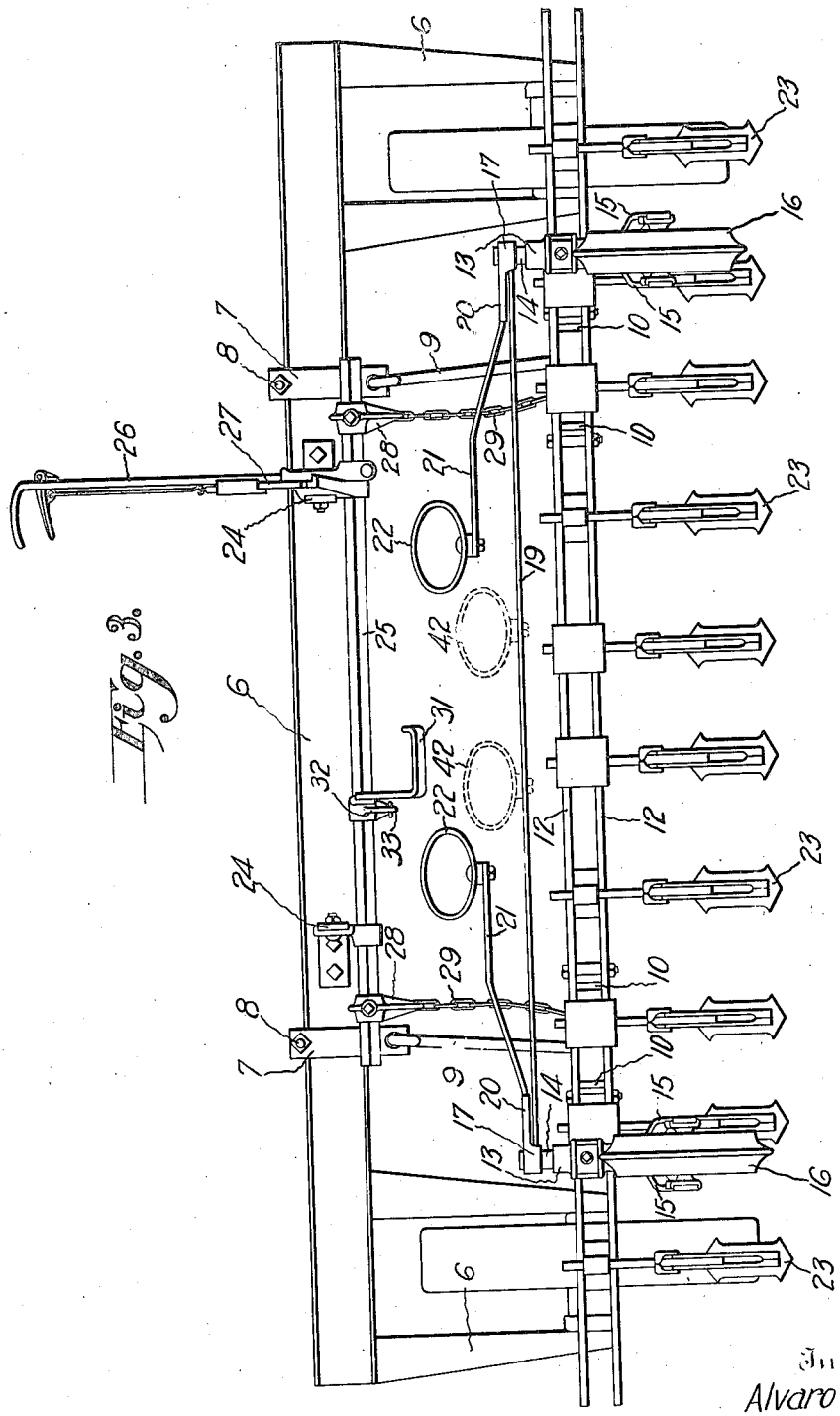
Inventor
Alvaro S. Krotz
By Attorney Patented Oct. 2, 1923.

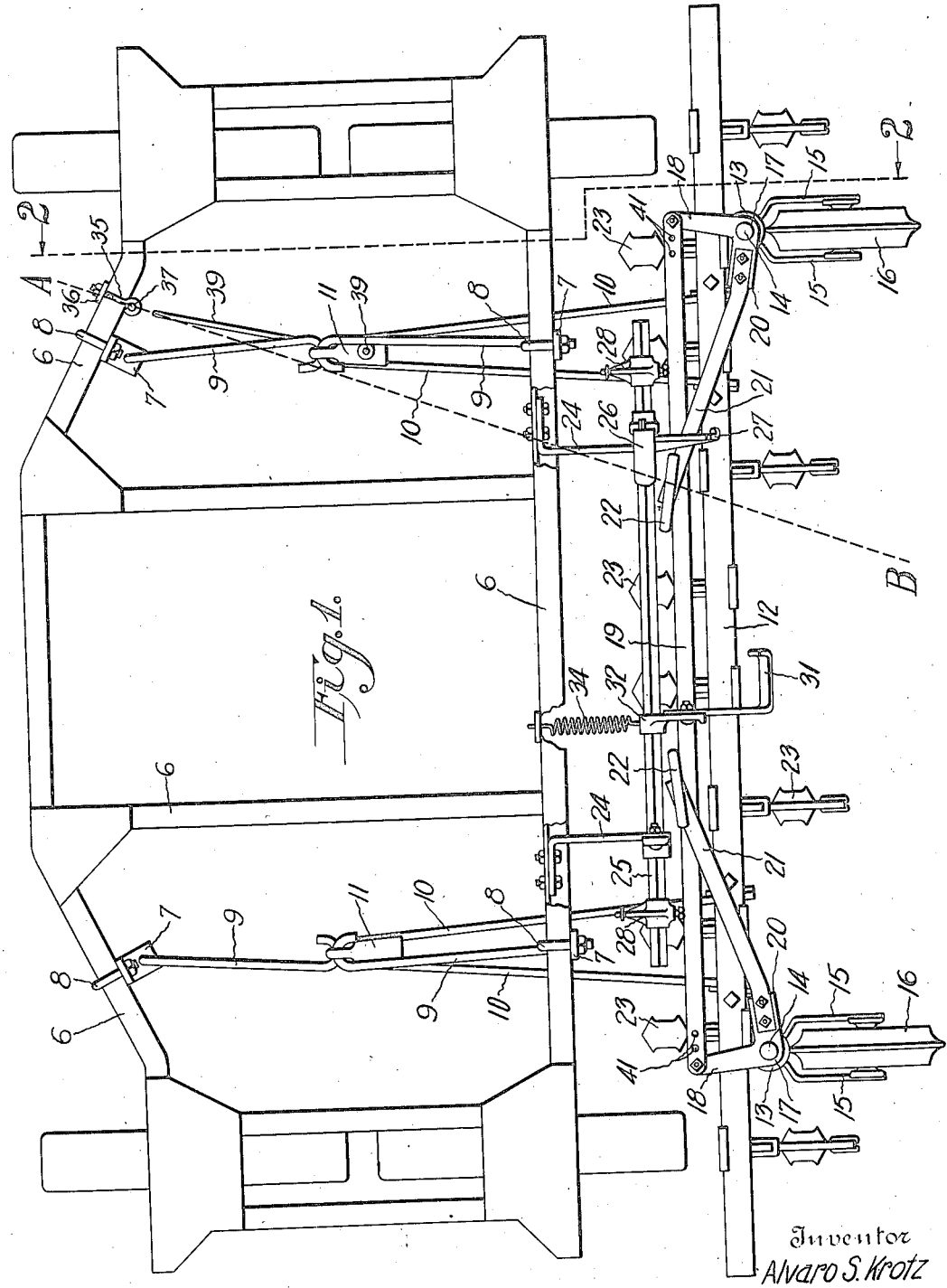

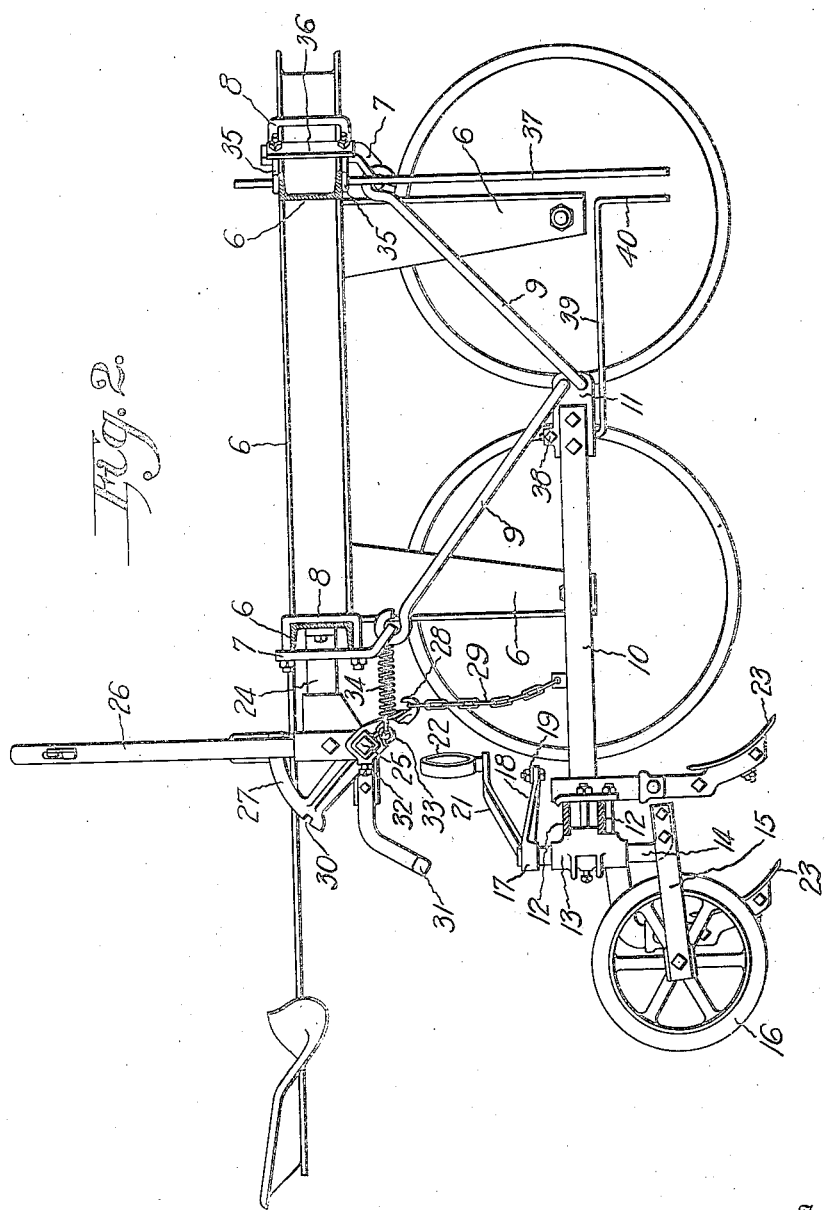

1,469,262

UNITED STATES PATENT OFFICE.

ALVARO S. KROTZ, OF JANESVILLE, WISCONSIN, ASSIGNOR TO GENERAL MOTORS CORPORATION, OF DETROIT, MICHIGAN, A CORPORATION OF DELAWARE.

TRACTOR CULTIVATOR ATTACHMENT.

Application filed August 16, 1920. Serial No. 403,900.

*To all whom it may concern:*

Be it known that I, ALVARO S. KROTZ, a citizen of the United States, and a resident of Janesville, county of Rock, and State of Wisconsin, have invented certain new and useful Improvements in Tractor Cultivator Attachments, of which the following is a full, clear, concise, and exact description, such as will enable others skilled in the art to which the invention relates to make and use the same, reference being made therein to the accompanying drawings, which form a part of this specification.

My invention relates to cultivating devices or mechanisms designed to be used as attachments for tractors of a type in common use and procurable in the open market; and the principal object thereof is to provide an improved cultivator attachment for tractors which may be readily attached to a tractor and secured thereto, and readily removed therefrom if and when it is desired to use the tractor for other than cultivating purposes. The tractor without the attachment as above stated is one of a form at present in use and on sale, and one which is capable of use with other attachments, or for general hauling purposes for which a tractor is suitable.

A further object of my invention is to provide an improved tractor attachment wherein the cultivator shovels are secured to a vertically swinging shovel bar and which bar is detachably secured to the main frame of the tractor through and by means of improved draft mechanism as will hereinafter appear.

A further object of my invention is to provide an improved cultivating device for use with tractors in which means are provided for enabling the operator to properly guide the cultivator shovels relative to the rows of plants to be cultivated, and in which said guiding means as well also as the cultivator shovels are adjustable to adapt a machine as a whole for use in cultivating rows of plants spaced different distances apart from one another.

A further object of my invention is to provide a cultivating device for tractors wherein improved means are provided whereby the shovel carrying bar and the shovels carried thereby may be moved transverse to the path of travel of the tractor, to thereby cause the shovels to operate properly alongside the rows of plants to be cultivated.

A further object of my invention is to provide an improved cultivator device for tractors having a guide carried by the tractor frame and which moves alongside a row of plants being cultivated and indicates the relationship of the cultivator shovels to the rows of plants, together with manually operable means for moving the shovel carrying bar of the cultivator transverse to the path of movement of the tractor; the cultivator mechanism having a second guide which occupies a definite relationship to said first mentioned guide when the tractor is being steered properly, and when the cultivator shovels are operating properly relative to the rows of plants being cultivated.

The drawings accompanying and forming a part of this application illustrate the preferred embodiment of my invention; altho the same may be variously modified and is regarded as including all such variations and modifications of the particular cultivating device illustrated and described as come within the scope of the concluding claims, wherein the distinguishing features in which my invention consists are particularly pointed out.

Referring now to the drawings,

Figure 1 is a view showing my improved cultivator attachment in plan, and as attached to a tractor of a type in common use.

Figure 2 is a view showing a section upon a vertical plane indicated by the line 2, 2, Figure 1, the parts of the tractor beyond said plane being shown in elevation.

Figure 3 is a view showing a tractor with my improved cultivating mechanism applied thereto in elevation, and as seen from a position at the rear thereof.

In the drawings, the reference numeral 6 designates the main frame of a tractor of a form at present in use; the same having depending pairs of legs at the four corners thereof which support the supporting and driving wheels of the tractor, which are located one between each pair of legs.

The frame 6 of the tractor includes transversely extending front and rear bars preferably of channel form and which are spaced apart from one another; and the reference numeral 7, 7 designates brackets secured to these cross members, as best shown in Figure 1, by means of U-shaped stirrups 8, said brackets having holes at their lower ends into which the forward ends of two pairs of draw rods all designated by the reference numeral 9 are hooked. The several draw rods incline downwardly toward one another as best shown in Figure 2, and their lower ends are pivotally connected with the forward ends of two substantially horizontal draw bars 10, 10; preferably by providing hooks at the lower ends of said draw rods which extend through holes provided in connecting members 11, 11 secured one to the forward end of each of the draw bars; the entire draft mechanism thus provided being one which is connected with the frame of the tractor through universal joints so that the draw bars and the shovel bar with which said draw bars are connected is capable of both sidewise movement relative to the line of travel of the tractor, and of up and down swinging movement whereby the draw bars and the shovel carrying bar with which the rear ends of said draw bars are connected may be swung upward about the pivotal connections between the front ends of said draw bars and the lower ends of the draw rods 9. It will also be appreciated that the inclined arrangement of the draw rods holds the front ends of the draw bars in substantially fixed positions, vertically, so that said front ends are incapable of any considerable amount of vertical movement.

The rear ends of the draw bars 10, 10 are connected with a shovel supporting bar which may be variously provided, but which is shown as comprising two parallel bars 12, 12 spaced a short distance apart and lying one above the other, and which shovel bar serves to support a plurality of shovels 23 which, as will be appreciated, engage the ground when the draw bars are in their lowermost position shown in Figure 2; but which shovels will clear the ground when the draw bars are swung upward about the pivotal connections between their forward ends and the lower ends of the draw rods 9. These shovels are adjustable along the shovel carrying bar so that they may be properly disposed relative to the rows of plants to be cultivated, to thereby adapt the device as a whole for cultivating rows of plants spaced differently apart from one another.

The reference numerals 13, 13 designate two brackets adjustably secured to the shovel carrying bar and having each a vertically extending bearing in which two vertically disposed oscillating shafts 14, 14 are supported; and which shafts serve as supports for two supporting and guiding wheels which run along the surface of the ground when the device is in use, said shafts being shown as provided each with two rearwardly extending bars 15, 15 secured to their lower ends and between which the supporting and guiding wheels 16, 16 are rotatably supported; the shafts 14, brackets 15 and wheels 16 therefore providing a castor arrangement in which the wheels are disposed to the rear of the vertical axes of the shafts 14 and about which axes the shafts and wheels swing, as will be appreciated.

Secured to the upper ends of the shafts 14, 14 are two bell-crank levers 17, 17 having forwardly extending arms 18, 18 connected one with the other by a transversely extending tie rod or bar 19, so that movement of either of said levers and of the shaft whereby it is carried is communicated to the other lever and shaft, and the said shafts and the wheels 16, 16 caused to move in unison.

The other arms 20, 20 of the bell-crank lever extend substantially at right angles to the arms 18, 18; and two operating bars 21, 21 are carried by these last mentioned arms and extend toward one another, and toward the center line of the machine. The inner ends of these operating bars or levers are provided with stirrups 22, 22 into which the feet of the operator may be inserted; from which it follows that forward movement of one stirrup will be communicated to and result in rearward movement of the other, such movement being communicated from either stirrup to the other through the two bell crank levers and the cross-bar extending between the forwardly projecting arms of said levers. The cross bar 19 is provided with a plurality of holes 41 at each of its ends in order to enable the caster wheels to be adjusted toward and from one another along the shovel carrying bar, to thereby properly adjust the cultivating device to the rows to be cultivated, as will be understood.

The reference numerals 24, 24 designate supporting brackets secured to the rearmost of the cross members of the frame 6 of the tractor and which brackets support an oscillating shaft 25; which shaft is preferably square in cross-section, as shown, said shaft being operated by means of a manually operable lever 26. This lever is provided with a suitable dog or latch adjacent its lower end which enters a notch 30 in a stationary segment 27, to thereby hold the lever in a position such that the shovel carrying bar, the shovels, and caster wheels will be held up and out of engagement with the ground. This shaft 25 is operatively connected with the shovel carrying bar so that rearward movement of the lever 26 will lift the said bar and the parts carried thereby; the lifting mechanism in the embodiment of my invention illustrated comprising two arms 28, 28 carried by said bar and spaced apart from one another, and having hooks at their free ends, which hooks engage the upper ends of chains 29 the lower ends of which are fastened to the said draw bars; from which it follows that rearward movement of the lever 26 will lift the shovel carrying bar and the parts carried thereby, the draw bars during this lifting operation swinging about fixed pivotal connections at their forward ends provided by the bracing or strut action of the inclined draw rods 9.

The shovel bar lifting shaft 25 is also preferably provided with a foot operated lever 31 to assist in rotating said bar and lifting the shovel bar; said lever being carried by a bell-crank lever 32 upon the rod 25 and said lever having a downwardly extending arm 33, as best shown in Figure 2. A tension spring 34 extends between the lower end of the arm 33 and a fixed portion of the frame 6 and acts to counterbalance the weight of the shovel carrying bar, the shovels and caster wheels carried thereby; to thereby provide for the easier and more effective raising of the shovel bar and parts carried thereby if and when it becomes necessary to do so, during which operation the action of the spring assists the effort of the operator, as will be understood.

Secured to the front transverse member of the tractor frame as by means of eye bolts 35 and a plate 36 is a guide member 37 shown as comprising a vertically extending rod which may be adjusted to any height, and to various positions along the length of the cross-bar to which it is secured; and the reference numeral 39 designates a second guide member in the form of a rod the rear portion of which extends upwardly through an opening provided in one of the castings 11 wherein it is secured by means of a set screw 38, while the forward end of said rod is bent downwardly, as indicated at 40, and is made to lie adjacent the lower end of the guide 37 above referred to.

In view of the premises it will be appreciated that when my improved cultivating device is in use and is properly adjusted relative to the spacing of the rows to be cultivated the operator, by pushing upon one or the other of the stirrups 22, may rotate the vertically extending shafts which support the guiding and supporting wheels 16, 16 and change the angular position of the said wheel relative to the shovel bar. The wheels 16, 16 are provided with sharp peripherally extending ridges at their center portions from which it follows that angular movement imparted to the shafts 14, 14 will cause the shovel carrying bar 12 to move to one side or the other, according to which of the stirrups 22 is pushed forward and which direction the wheels are swung; as the ridges upon the wheels cut into the ground and cause the wheels to pull the shovel bar to one side or the other as the wheels are swung relative to the shovel bar. The operator may, therefore, by pushing upon the proper stirrup cause the shovel carrying bar to move sideways, and the shovels carried thereby to operate properly adjacent the rows of plants cultivated without injury thereto; it being appreciated that the guiding wheels support the shovel bar and regulate the depth to which the shovels enter the ground, and also provide the necessary abutments for swinging the shovel bar sideways because of their action as caster wheels trailing behind the shafts whereby they are supported.

In setting up the machine and adapting it for cultivating purposes the guide member 37 will be so positioned upon the cross bar to which it is secured that its lower end will travel alongside a row of plants to be cultivated, and the guide member 39 will be so adjusted that when the machine is travelling straight ahead the depending end 40 thereof will lie adjacent the lower end of the rod 37 and will be seen by the operator back of said lower end and along the line of sight indicated by the line —A B—, Figure 1 of the drawing. Such being the case a movement of the two guides out of line with one another will indicate that the shovels are not properly positioned alongside the rows of plants being cultivated; whereupon the operator, by pushing upon one or the other of the stirrups 22, may move the shovel supporting bar to one side or the other and cause the depending portion 40 of the guide 39 to keep in a position in line with the guide 37, which position will be an indication that the shovels are operating properly alongside the rows of plants being cultivated.

I have above described a form of my invention in which motion is communicated to the supporting and guiding wheels 16, 16 of the shovel carrying bar through mechanism including the bell-crank levers, and arms 21 having stirrups 22 at their free ends. Said stirrups may, however, be secured directly to the cross bar 19, as shown at 42 in Figure 3, in which case the arms 21 may be dispensed with and the bell-crank levers replaced by arms upon the upper ends of the shaft 14, 14, the forward ends of which are connected with the said transverse bar 19 in the same way as the free ends of the arms 18 are connected with said bar in the form of my invention illustrated. In this modified form of my invention a sidewise push imparted to either of the stirrups 42, 42 will move the transverse bars 19 in the direction of its length, thus imparting oscillatory movement to the shafts 14, 14 which will swing the supporting arms carried by the lower ends of said shafts angularly relative to the direction of travel of the tractor, which action, as will be appreciated, will result in a corresponding movement of the shovel carrying bar and the shovels carried thereby.

Having thus described and explained my invention, I claim and desire to secure by Letters Patent:

1. In a cultivating device and in combination with a tractor or vehicle frame having transversely extending front and rear cross bars, two pairs of draw rods the upper ends of the rods of each pair being pivotally connected one with one and the other with the other of said cross bars, and the rods of each pair being inclined downward and toward one another and the lower ends of the rods of each pair lying adjacent one another; two draw bars the forwards ends of which are pivotally connected one with the lower ends of one pair and the other with the lower end of the other pair of said pairs of draw rods; a shovel carrying bar with which the rear ends of said draw bars are fixedly connected; two brackets carried by said shovel carrying bar and which brackets are provided each with a vertically extending bearing; two oscillating wheel supporting shafts supported one in each of said bearings; two wheel supporting members secured one to the lower end of each of said shafts and extending rearwardly therefrom; two supporting and guiding wheels supported one by each of said wheel supporting members, and which wheels are adapted to run upon the ground; two bell-crank levers secured one to the upper end of each of said shafts; a bar extending between two of the arms of said bell crank levers and serving to connect said arms with one another to thereby secure simultaneous movement of said shafts; and two foot operated levers carried one by each of the other arms of said bell crank levers and the free ends of which are disposed adjacent one another.

2. In a cultivating device and in combination with a tractor or vehicle frame, two pairs of draw rods the upper ends of the rods of each pair being pivotally connected with said frame at points spaced apart from one another in the direction of travel of the tractor, and the lower ends of the rods of each pair lying adjacent one another; two draw bars the forward ends of which are pivotally connected one with the lower ends of the rods of one pair of draw rods, and the other with the lower ends of the rods of the other pair of draw rods; a shovel carrying bar with which the rear ends of said draw bars are fixedly connected; two oscillating supporting and guiding wheels carried by said shovel supporting bar and adapted to run upon the ground; and means carried by said shovel supporting bar for varying the angular position of said wheels relative to said shovel supporting bar.

3. In a cultivator device and in combination with a tractor or vehicle frame, two pairs of draw rods the upper ends of the rods of each pair being connected with said frame at points spaced apart from one another in the direction of travel of the tractor, and the lower ends of the rods of each pair lying adjacent one another; two draw bars the forward ends of which are pivotally connected one with the lower ends of the rods of one pair of draw rods, and the other with the lower ends of the rods of the other pair of draw rods; a shovel carrying bar with which the rear ends of said draw bar are fixedly connected; two caster wheels carried by said shovel carrying bar and so arranged as to swing about vertically extending axes, and which caster wheels are adapted to run upon the ground; and means for swinging said caster wheels about the axes aforesaid to thereby vary their position relative to said shovel supporting bar.

4. In a cultivating device and in combination with a tractor or vehicle frame, two pairs of draw rods the upper ends of the rods of each pair being connected with said frame at points spaced apart from one another in the direction of travel of the tractor, and the lower ends of the rods of each pair lying adjacent one another; two draw bars the front ends of which are pivotally connected one with the lower ends of the rods of one pair of draw rods, and the other with the lower ends of the rods of the other pair of draw rods; a transversely movable shovel carrying bar with which the rear ends of said draw bars are fixedly connected; and two guide members carried one by said frame and the other by one of said draw bars, and which guide members lie adjacent one another.

5. In a cultivating device and in combination with a tractor or vehicle frame, two pairs of draw rods the upper ends of the rods of each pair being connected with said frame at points spaced apart from one another in the direction of travel of the tractor, and the lower ends of the rods of each pair lying adjacent one another; two draw bars the front ends of which are pivotally connected one with the lower ends of the rods of one pair of draw rods, and the other with the lower ends of the rods of the other pair of draw rods; a shovel carrying bar with which the rear ends of said draw bar are conected; two vertically arranged oscillating shafts supported by said shovel carrying bar; two supporting and guiding wheels supported one by each of said shafts, and which wheels are adapted to run upon the ground; and means operatively connected with said shafts for simultaneously imparting angular movement thereto to thereby vary the angular position of said wheels relative to said shovel supporting bar.

6. In a cultivating device and in combination with a tractor or vehicle frame, a shovel carrying bar; two brackets carried by said shovel carrying bar and having each a vertically arranged bearing; two oscillating shafts supported one in each of said bearings; two supporting and guiding wheels supported one by each of said shafts and located at the lower ends thereof, and which wheels are adapted to run upon the ground; means operatively connected with the upper ends of said shafts for simultaneously moving them about their vertical axes; two draw bars the rear ends of which are fixedly connected with said shovel carrying bar; and means for pivotally connecting the forward ends of said draw bars with said frame.

7. In a cultivating device and in combination with a tractor or vehicle frame, a shovel carrying bar; two brackets carried by said shovel carrying bar and having each a vertically arranged bearing; two oscillating shafts supported one in each of said bearings; two arms secured to the lower end of each of said shafts and extending rearwardly therefrom; two supporting and guiding wheels supported one between the free ends of each of said pairs of arms, and which wheels are adapted to run upon the ground; means operatively connected with the upper ends of said shafts for simultaneously moving them about their vertical axes; two draw bars the rear ends of which are fixedly connected with said shovel carrying bar; and draft mechanism for connecting the forward ends of said draw bars with said frame.

8. In a cultivating device and in combination with a tractor or vehicle frame, a shovel carrying bar movable transversely to the direction of travel of the tractor; two vertically arranged oscillating shafts supported by said shovel carrying bar; two supporting and guiding wheels supported one from the lower end of each of said shafts, and which wheels are adapted to run upon the ground; means operatively connected with said shafts for simultaneously moving them about their vertical axes; two draw bars the rear ends of which are fixedly connected with said shovel carrying bar; and draft mechanism whereby the forward ends of said draw bars are connected with said frame.

9. In a cultivating device and in combination with a tractor or vehicle frame, a shovel carrying bar; two vertically arranged oscillating shafts supported by said shovel carrying bar; two supporting and guiding wheels supported one from the lower end of each of said shafts, and which wheels are adapted to run upon the ground; foot operated means operatively connected with said shafts for simultaneously moving them about their vertical axes; and draft mechanism through which said shovel carrying bar is connected with said frame so as to be drawn thereby, and which mechanism is so arranged as to permit movement of said shovel carrying bar transverse to the path of movement of the tractor.

10. In a cultivating device and in combination with a tractor or vehicle frame, a shovel carrying bar; draft mechanism through which said shovel carrying bar is connected with said frame so as to be drawn thereby, and which mechanism is so arranged as to permit movement of said shovel carrying bar transverse to the path of movement of the tractor; and two guide members located adjacent one another, one of said guide members being carried by said frame and the other being connected with said shovel supporting bar in such a manner as to partake of the transverse movement thereof.

11. In a cultivating device and in combination with a tractor or vehicle frame, a shovel carrying bar movable transverse to the direction of travel of the tractor; two vertically arranged oscillating shafts supported by said shovel carrying bar; two supporting and guiding wheels supported one from the lower end of each of said shafts, and which wheels are adapted to run upon the ground; means operatively connected with said shafts for simultaneously moving them about their vertical axes; and draft mechanism through which said shovel carrying bar is connected with said tractor frame so as to be drawn by the tractor.

In testimony whereof I affix my signature.

ALVARO S. KROTZ.